(12) United States Patent
Uno

(10) Patent No.: US 6,470,118 B1
(45) Date of Patent: Oct. 22, 2002

(54) OPTICAL MODULE

(75) Inventor: Yutaka Uno, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 58 days.

(21) Appl. No.: 09/699,688

(22) Filed: Oct. 31, 2000

(30) Foreign Application Priority Data

May 24, 2000 (JP) ........................................ 2000-152906

(51) Int. Cl.[7] ................................................ G02B 6/30
(52) U.S. Cl. ...................................................... 385/49
(58) Field of Search ............................. 385/49, 50, 83, 385/129, 130, 131, 132

(56) References Cited

U.S. PATENT DOCUMENTS

| 4,750,799 A | * | 6/1988 | Kawachi et al. ............... 385/14 |
| 5,737,138 A | * | 4/1998 | Someno ....................... 359/900 |
| 5,757,999 A | * | 5/1998 | Tabuchi et al. ................. 385/93 |
| 5,784,509 A | * | 7/1998 | Yamane et al. ................. 385/49 |
| 5,978,531 A | * | 11/1999 | Funabashi ..................... 385/45 |
| 6,112,002 A | * | 8/2000 | Tabuchi ........................ 385/50 |
| 6,160,936 A | * | 12/2000 | You et al. ...................... 385/49 |
| 6,219,484 B1 | * | 4/2001 | Rhee et al. ................... 385/137 |
| 6,298,192 B1 | * | 10/2001 | Yoo et al. .................... 385/137 |

FOREIGN PATENT DOCUMENTS

JP          10-133069          5/1998

* cited by examiner

Primary Examiner—Tulsidas Patel
Assistant Examiner—Thanh-Tam Le
(74) Attorney, Agent, or Firm—Wenderoth, Lind & Ponack, L.L.P.

(57) ABSTRACT

An optical module includes an optical waveguide element having an optical axis which can be adjusted with high accuracy. An optical waveguide element 10 is arranged on an Si bench substrate 70 such that an optical waveguide layer (including a lower clad layer 14, a core layer 16, and an upper clad layer 18) faces the upper surface of the Si bench substrate 70, and is fixed to that surface with an adhesive 90. A plurality of spherical spacers 92 (fine particles made of quartz, for instance) are arranged between the optical waveguide element 10 and the Si bench substrate 70. The gap distance between the optical waveguide element 10 and the Si bench substrate 70 is regulated by the diameter of the spacer 92.

16 Claims, 5 Drawing Sheets

OPTICAL MODULE

BACKGROUND OF THE INVENTION

1. Field of the Invention

The present invention relates to an optical module.

2. Prior Art

In order to realize a multimedia-based society, it is indispensable to set up an effective infrastructural arrangement for multimedia communication systems. Among other various plans for realizing that, recently, "The Fiber To The Home (FTTH)" plan has been pushed forward attracting a great deal of attention. This is the plan according to which respective personal homes are connected with one another by means of optical fiber cables extended thereto, thereby establishing a higher speed digital communication network among them. In this case, it is necessary for such an optical communication system using optical fiber cables as mentioned above to be provided with an optical transmitter module having an ability to convert an electrical signal into an optical signal and then output the converted optical signal to the optical fiber cable, and an optical receiver module having an ability to receive the optical signal transmitted through the optical fiber cable and then convert it into an electrical signal, or to be provided with an optical transmitter-receiver module having both of these functions.

In general, the optical transmitter-receiver module includes optical waveguide elements, optical fiber cables and optoelectronic parts, and the optical fiber cables and optoelectronic parts are to be coupled with the optical waveguide. These optical waveguide elements, optical fiber cables and optoelectronic parts are integrally mounted on a silicon (Si) bench substrate.

In a prior art optical transmitter-receiver module, as disclosed in the JP unexamined Patent Publication (KOKAI) No. H10-133069 (Title: Optical Transmitter-Receiver, Assignee: Kyosera K. K.), the optical waveguide element is mounted on an Si bench substrate such that the upper surface of an optical waveguide layer forming the optical waveguide element directly lies on the upper surface of the Si bench substrate. The film thickness of a clad layer forming the optical waveguide layer has been controlled such that the height (optical axis height) of a core layer forming the optical waveguide layer, from the upper surface of the Si bench substrate coincides with the optical axis height of the optical fiber cable and also with that of the optoelectronic part.

In general, the optical waveguide layer (core layer, clad layer) of the optical waveguide element made of the quartz having the excellent optical property is formed by means of the Flame Hydrolysis Deposition (FHD) method used for manufacturing optical fiber cables or the Chemical Vapor Deposition (CVD) method used for manufacturing semiconductor elements. When forming the optical waveguide layer by one of these methods, however, there is possibility of causing the problems as described in the following.

According to the FHD method, a raw material is first hydrolyzed in the oxyhydrogen flame, thereby heaping up fine particles of glass. Then, these fine glass particles are heated at a high temperature of more than one thousand several hundreds degrees centigrade, thereby producing a transparent glass layer. With this heat treatment, fine glass particles are melted and firmly combined together to form a dense glass layer (i.e., optical waveguide layer). However, owing to not only the large cubical contraction coefficient of the glass layer formed by FHD method but also difficulty in controlling the film thickness of this glass layer, the mean value of the film thickness is apt to indicate an undesirable large fluctuation and to make the tolerance larger, accordingly. Under certain circumstances, there is possibility of experiencing variation of about 20% with respect to the glass layer film thickness. For instance, if the optical waveguide element is mounted on the Si bench substrate under the condition that the optical axis height of the core layer is set to 10 μm, optical axis misalignment of plus or minus 2 μm may be caused in the optical waveguide element, so that the optical coupling loss between the optical waveguide element and the optical fiber cable or the optoelectronic part might be increased to the extent that information transmission might be adversely affected to invite deterioration thereof.

According to the CVD method, since the glass layer is formed through the process of CVD reaction, there is no need to carry out such a heat treatment as described above. Consequently, the film thickness of the glass layer can be controlled with ease, and the film thickness can be managed within a range of at most 5% of a set value even though it is fluctuated. For instance, if the optical waveguide element is mounted on the Si bench substrate under the condition that the optical axis height of the core layer is set to 10 μm, the optical axis misalignment in the optical waveguide element can be managed within the range of plus or minus 0.5 μm. Therefore, the optical coupling loss between the optical waveguide element and the optical fiber cable or the optoelectronic part might become so small that it is possible to neglect that loss.

However, in the process of manufacturing the optical waveguide element by heaping up glass layers in a chamber for carrying out the CVD method, some fine glass particles once deposited on the inside wall surface of the chamber come off therefrom, fall down on the top surface of the glass layers being processed, and are fixed thereto. Consequently, the falling fine glass particle causes a defect in the form of a projection resulting in an uneven surface of the glass layer. This projection shaped defect in the glass layer further gives the variation of several microns to the optical axis height of the optical waveguide element, so that it might cause an increase in the coupling loss between the optical waveguide element and the optical fiber cable or the optoelectronic part. Because of the structure of the CVD equipment, it would be hard to completely prevent that during the CVD process, and the fine glass particle is deposited on and then comes off from the inside wall of the CVD chamber, Therefore, it would be actually impossible to completely protect the glass layer from the defect in the form of the projection as mentioned above.

As has been discussed above, according to the prior art optical transmitter-receiver module, if the film thickness of the optical waveguide layer is not uniformly formed or the projection shaped defect is caused on the surface of the optical waveguide, the optical axis height of the waveguide element is varied. Therefore, it is difficult to establish the excellent optical coupling between the optical waveguide element and the optical fiber cable or the optoelectronic part.

Accordingly, the invention has been made in view of problems as described above, and its main object is to provide an optical module in which the optical axis of the optical waveguide element is made adjustable with high accuracy.

SUMMARY OF THE INVENTION

In order to solve the problems as described above, the invention provides an optical module which includes an optical waveguide element having an optical waveguide, and a bench substrate on which the optical waveguide element is mounted. The optical waveguide element is mounted on the bench substrate through one or more spacers. According to the optical module having the constitution described above, the optical axis height of the optical waveguide element, that is, the height from the upper surface of the bench substrate to the optical waveguide can be adjusted with high accuracy by regulating the size of the spacer.

Each of the spacers is preferably prepared in the form of a sphere. The spherical spacer is advantageous. For instance, when mounting the optical waveguide element on the bench substrate, if the optical waveguide element includes some defects such as projections on its surface directly facing the bench substrate, each spherical spacer having met with the projection can rotate itself to seek and move to a more flat place, thereby avoiding meeting with and staying on the projection. Thus, the gap distance between the optical waveguide element and the bench substrate can be regulated with the diameter of the spherical spacer. Furthermore, it is preferable to use the spherical spacer which is made of a material such as quartz having a small thermal expansion coefficient. With this, even if the ambient temperature surrounding the optical module is changed, it is possible to keep the height from the upper surface of the bench substrate to the optical waveguide constant.

The bench substrate has one or more first recesses on its surface on which the optical waveguide element is mounted. Each of the spherical spacers is accepted in part by these first recesses. Consequently, when the optical waveguide element is mounted on the bench substrate, each spherical spacer can be prevented from being scattered.

The optical waveguide element has one or more second recesses on its surface which faces the bench substrate when the optical waveguide element is mounted on the bench substrate. Each of the spherical spacers is accepted in part by these second recesses, so that the gap distance between the bench substrate and the optical waveguide element is regulated by the spacer. At the same time, the optical waveguide element is positioned such that it directs to a predetermined direction with respect to the bench substrate surface.

If each of the first and second recesses are respectively prepared in the form of a V-shaped groove, the position (one axis) of the optical waveguide element in the direction intersecting the longitudinal axis of the V-shaped groove at right angles can be determined.

Each of the first recesses is prepared in the form of a first cavity which can accept one of the spacers. This first cavity is preferably prepared in such a shape that it has inside wall surfaces with which the surface of each spacer accepted therein can make contact at least at three points. Also, each of the second recesses is prepared in the form of a second cavity which can also accept one of the spacers. This second cavity is preferably prepared in such a shape that it has inside wall surfaces with which the surface of each spacer accepted therein can make contact at least at three points. According to the constitution like the above, the position (two axes) of the optical waveguide element can be determined with respect to the horizontal direction. Actually, these first and second cavities may be prepared in the form of an almost right pyramid or an almost circular cone. Furthermore, these cavities may be prepared in the form of a right pyramid or a circular cone having uneven portions on their inside wall surfaces.

The invention will now be described in detail with regard to several preferred embodiments of the optical module according to the invention, with reference to the accompanying drawings. In the following description and drawings, the constituents of the invention having like functions and constitutions are denoted with like reference numerals or marks in order to avoid repetitive description.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments.

In the accompanying drawings.

PREFERRED EMBODIMENTS OF THE INVENTION

[First Embodiment]

Figure 1:
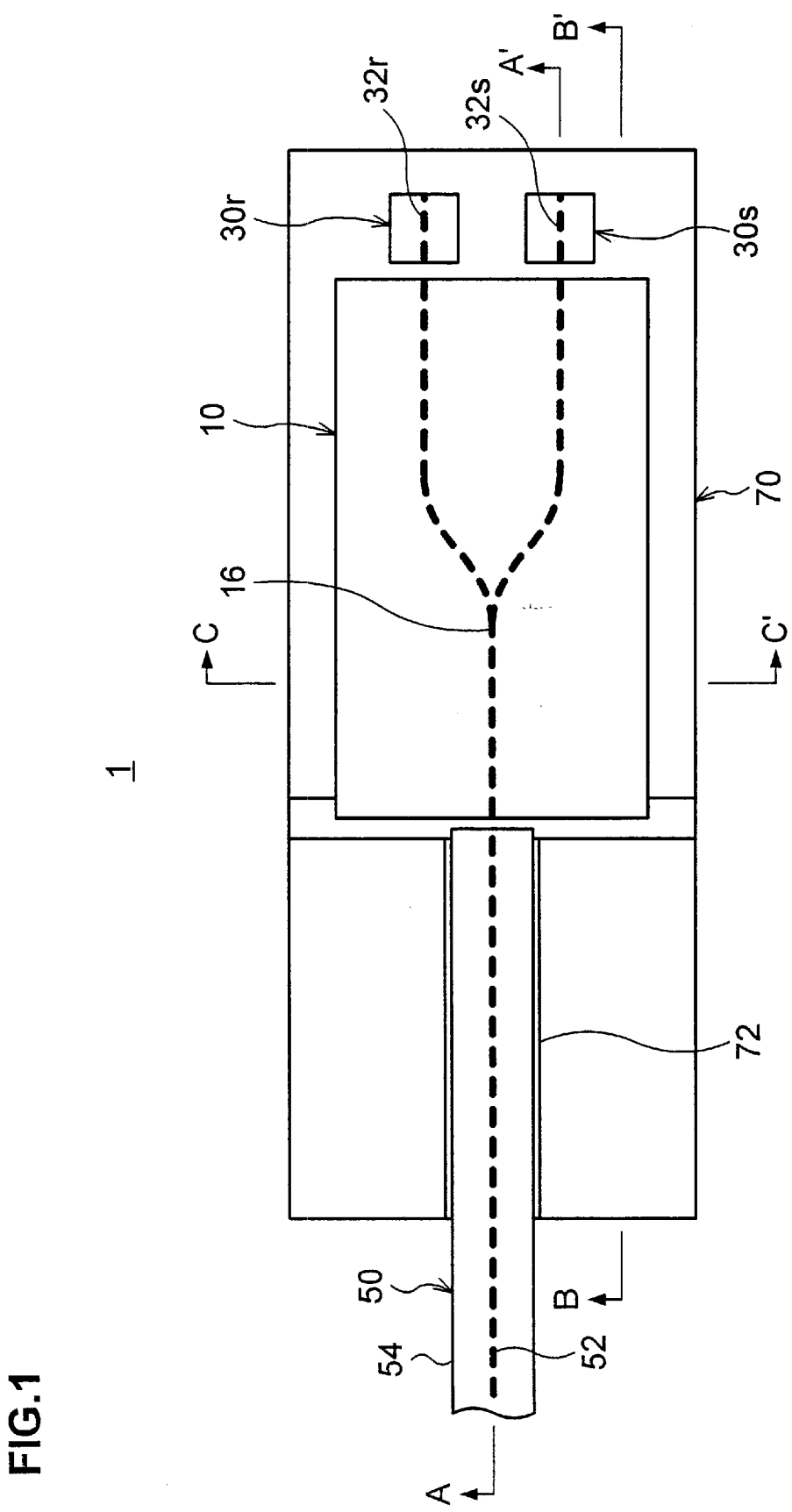
FIG. 1 is a plan view of an optical transmitter-receiver module according to a first embodiment of the invention.
Figure 2:
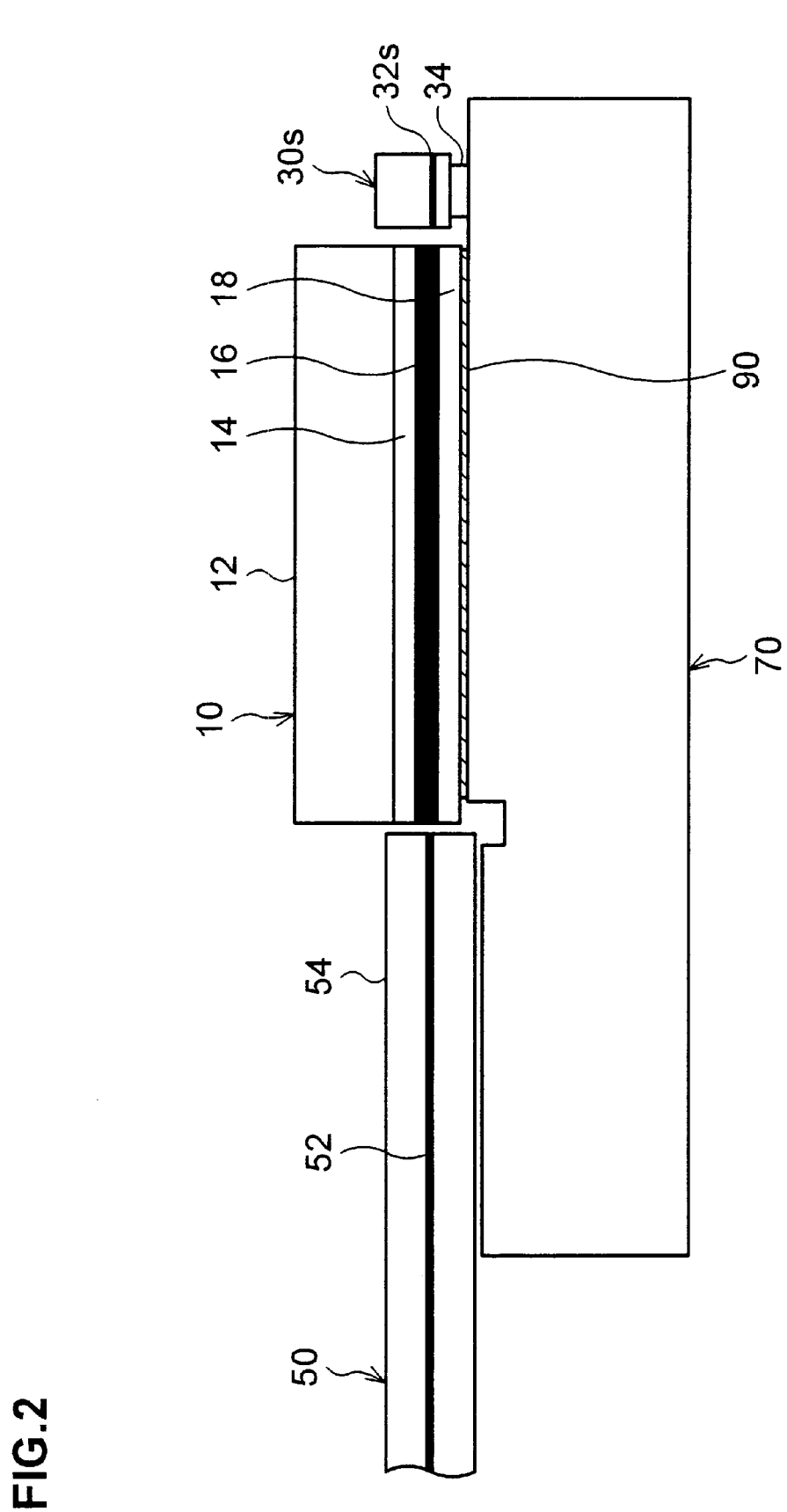
FIG. 2 is a cross sectional view taken along the line A–A' of the optical transmitter-receiver module shown in FIG. 1.
Figure 3:
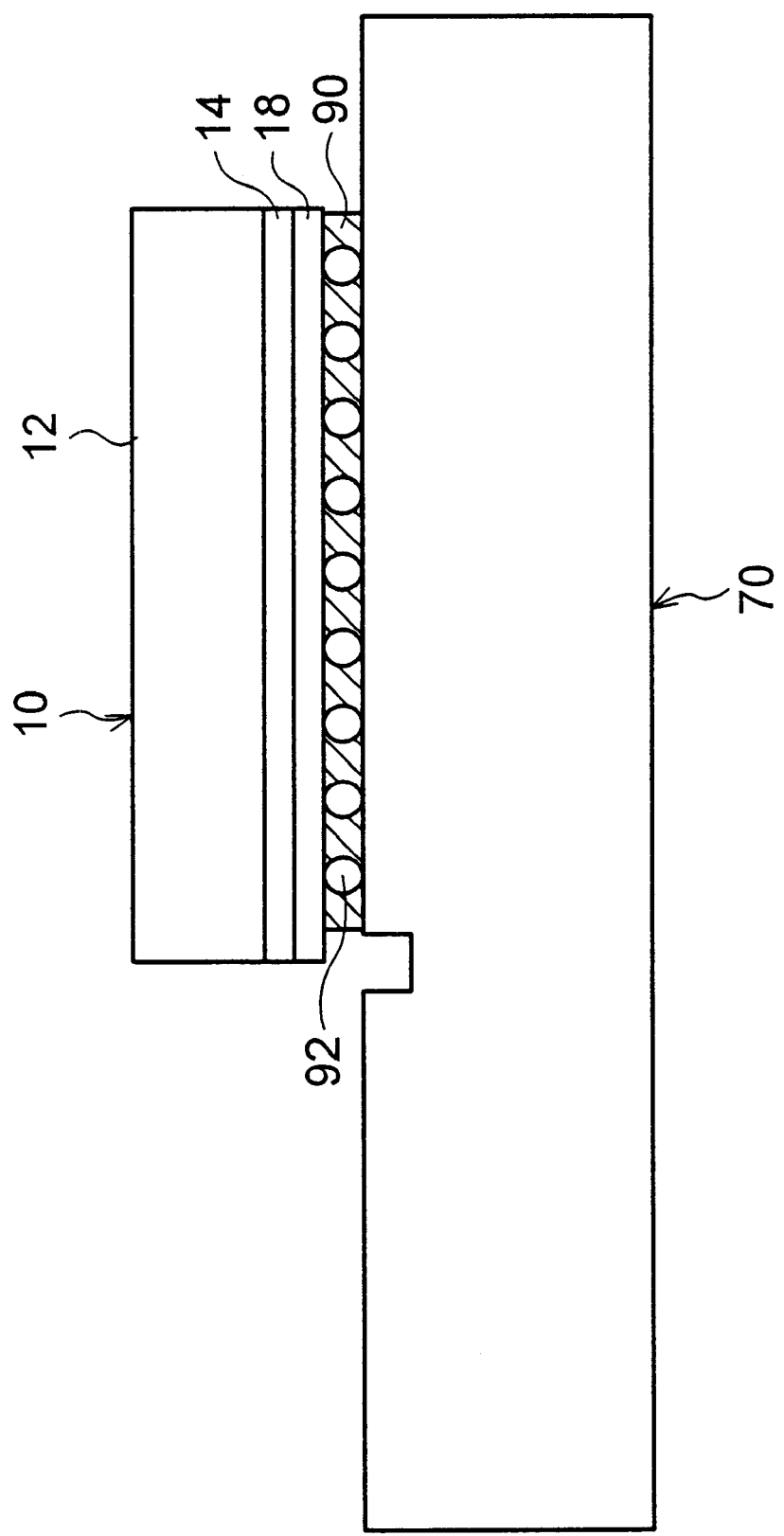
FIG. 3 is a cross sectional view taken along the line B–B' of the optical transmitter-receiver module shown in FIG. 1.
Figure 4:
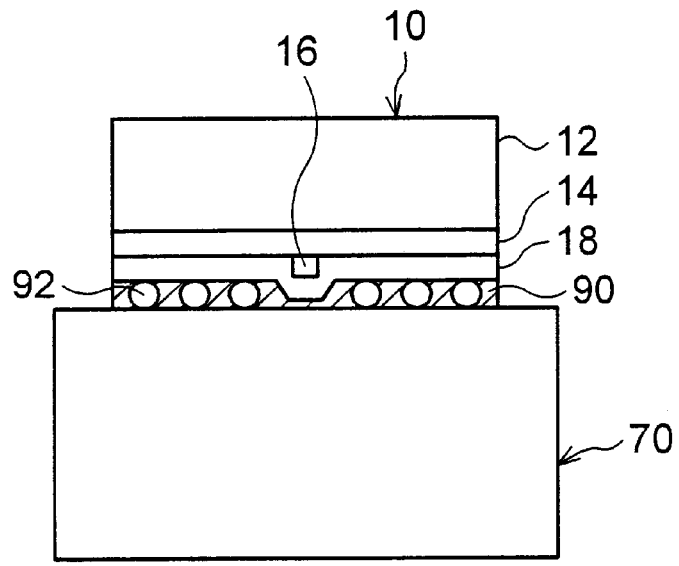
FIG. 4 is a cross sectional view taken along the line C–C' of the optical transmitter-receiver module shown in FIG. 1.

An optical transmitter-receiver module according to a first embodiment of the invention is illustrated in FIG. 1 through FIG. 4. FIG. 1 is a plan view of the optical transmitter-receiver module, while FIG. 2 through FIG. 4 are cross sectional views respectively taken along lines A–A', B–B' and C–C' of the optical transmitter-receiver module shown in FIG. 1.

The optical transmitter-receiver module 1 capable of transmitting and receiving optical signals includes an optoelectronic part (transmitting side) 30s, an optoelectronic part (receiving side) 30r, an optical fiber cable 50, and an Si bench substrate 70. The optical waveguide element 10, the optoelectronic part (transmitting side) 30s, the optoelectronic part (receiving side) 30r, and the optical fiber cable 50 are mounted on the Si bench substrate 70.

As shown in FIG. 2, the optical waveguide element 10 includes of a substrate 12 (Si or quartz substrate), a lower (first) clad layer 14, a core layer 16 and an upper (second) clad layer 18, and these three layers 14, 16, 18 form an optical waveguide channel layer and are subsequently piled up (layered) on the upper surface of the substrate 12 in this order. As shown in FIG. 1, the core layer 16 includes a Y-shaped optical path which is used for transmitting the optical signal outputted by the optoelectronic part (transmitting side) 30s toward the optical fiber cable 50, and also used for inputting the optical signal transmitted through the optical fiber cable 50 to the optoelectronic part (receiving side) 30r.

The optoelectronic part (transmitting side) 30s may be formed of a semiconductor laser, for instance. In this case, the optical axis 32s of the optoelectronic part (transmitting side) 30s serves as the active layer of the semiconductor laser. The optoelectronic part (receiving side) 30r may be formed of a photodiode. In this case, the optical axis 32r of the optoelectronic part (receiving side) 30r serves as the photo-receiving center of the photodiode.

The optical fiber cable 50 includes a core portion 52 and a clad portion 54 covering the core portion 52.

As shown in FIG. 2, the optoelectronic part (transmitting side) 30s and the optoelectronic part (receiving side) 30r are fixed to the electrode (not shown) formed on the upper surface of the Si bench substrate 70 by solder 34. In FIG. 2, only the optoelectronic part (transmitting side) 30s is indicated, but the optoelectronic part (receiving side) 30r is also mounted in the same manner. The height (optical axis height) from the upper surface of the Si bench substrate 70 to the center of the optical axis 32s of the optoelectronic part (transmitting side) 30s is adjusted to a predetermined value (10 μm, for instance). In the same manner, the height (optical axis height) from the upper surface of the Si bench substrate 70 to the center of the optical axis 32r of the optoelectronic part (receiving side) 30r is also adjusted to a predetermined value (10 μm, for instance).

The optical fiber cable 50 is arranged to lie in a V-shaped groove 72 which is formed by applying Si anisotropic etching to the Si bench substrate 70. The width and depth of this V-shaped groove 72 is adjusted such that the height (optical axis height) from the upper surface of the Si bench substrate 70 to the center of the core portion 52 of the optical fiber cable 50 has a predetermined value (10 μm, for instance).

As described above, each optical axis height of the optoelectronic part (transmitting side) 30s, the optoelectronic part (receiving side) 30r, and the optical fiber cable 50 is uniformly adjusted to have the same predetermined value (10 μm) so as to coincide with each other.

The optical waveguide element 10 is arranged on the upper surface of the Si bench substrate 70 such that the optical waveguide channel layer (i.e., lower clad layer 14, core layer 16, upper clad layer 18) side faces the upper surface of the Si bench substrate 70, and is fixed thereto by an adhesive 90.

As shown in FIGS. 3 and 4, a plurality of spherical spacers 92 (fine quartz particles, for instance) are provided between the optical waveguide element 10 and the Si bench substrate 70. Accordingly, the gap distance between the optical waveguide element 10 and the Si bench substrate 70 is regulated by the diameter of the spherical spacer 92. By the way, the optical axis height of the optical waveguide element 10 (i.e., the height from the upper surface of the Si bench substrate 70 to the center of the core layer 16) is required to coincide with each optical axis height of the optoelectronic part (transmitting side) 30s, the optoelectronic part (receiving side) 30r, and the optical fiber cable 50. In other words, the optical axis of the optical fiber cable, the optical language element, and the optoelectronic part(s) are coplanar. In order to fulfil this requirement, the diameter of the spherical spacer 92 regulating the optical axis height of the optical waveguide element 10 can be obtained according to the following formula.

$$Dsp = Haxis - Tuc + Tc/2$$

where

Dsp:Diameter of Spacer 92

Haxis:Optical axis height

Tuc:Film thickness of upper clad 18, and

Tc:Film thickness of core layer 16

For instance, when the optical axis height is 10 μm, the film thickness of upper clad layer 18 is 5 μm, and the film thickness of core layer 16 is 6 μm, the diameter of Spacer 92 is calculated to be 8 μm.

When mounting the optical waveguide element 10, the optoelectronic part (transmitting side) 30s, and the optoelectronic part (receiving side) 30r on the Si bench substrate 70, mutual positioning among them in the horizontal direction is carried out with the help of an alignment marker (not shown) which is provided for respective parts to be mounted on the substrate 70.

The adhesive 90 is preferably a type capable of being cured with ultraviolet lays. When adjustment of the optical axis height and positioning in the horizontal direction with respect to the optical waveguide element 10 is finished, irradiation of the ultraviolet rays is performed against the adhesive 90, thereby securing the optical waveguide 10 on the Si bench substrate 70.

As has been discussed above, in the optical transmitter-receiver module 1 according to the first embodiment of the invention, existence of a plurality of spherical spacers 92 arranged between the optical waveguide element 10 and the Si bench substrate 70 can bring about the following advantageous effects.

Even if a relatively large error takes place with respect to the film thickness of the optical waveguide layer constituting the optical waveguide element 10, the optical waveguide element 10, the optoelectronic part (transmitting side) 30s, the optoelectronic part (receiving side) 30r, and the optical fiber cable 50 can be arranged to make their respective optical axis heights equal by adjusting the size of the spherical spacer 92. Consequently, the coupling loss between them can be reduced to a minimum.

The spacer 92 can advantageously act because it is prepared in the shape of a sphere. For instance, while the optical waveguide element 10 having some projections on the surface of the optical waveguide layer side is mounted on the Si bench substrate 70, if the spacer 92 placed on the Si bench substrate 70 meets the projection, the spacer 92 could try to seek a more flat and smooth surface to move thereto by itself in order to avoid making a direct contact with the projection. As mentioned above, since the spacer 92 acts to avoid making direct contact with the projection, even if the optical waveguide element 10 includes some defects like projections formed on the surface of the optical waveguide layer side, the optical axis height of the optical waveguide element 10 can be adjusted with high accuracy by the spacer 92.

[Second Embodiment]

Figure 5:
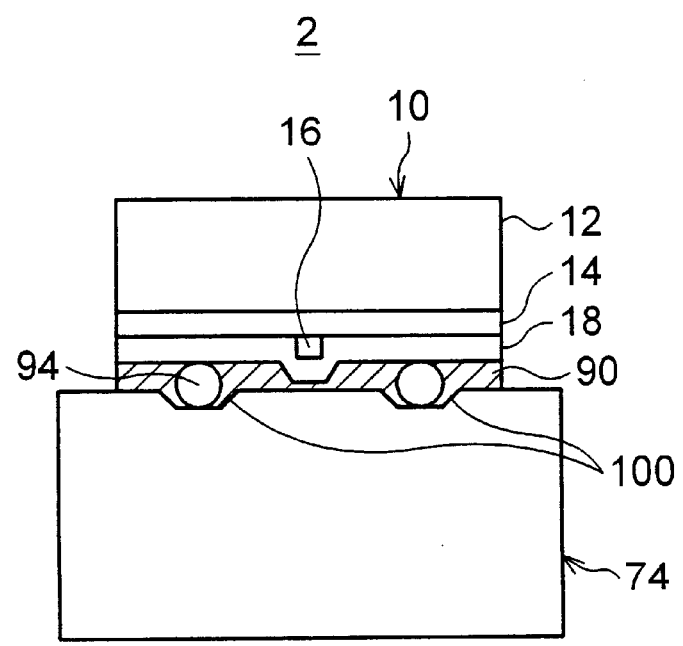
FIG. 5 is a cross sectional view of an optical transmitter-receiver module according to a second embodiment of the invention.

An optical transmitter-receiver module 2 according to a second embodiment of the invention will now be described with reference to FIG. 5. This figure is a cross sectional view of the optical transmitter-receiver module 2 and is equivalent to the C–C' cross sectional view (see FIG. 1 and FIG. 4) of the optical transmitter-receiver module 1 according to the first embodiment of the invention.

The optical transmitter-receiver 2 has such a constitution that can be obtained by substituting an Si bench substrate 74 for the Si bench substrate 70 which is used in the optical transmitter-receiver module 1 according to the first embodiment of the invention. The Si bench substrate 74 is provided with a plurality of recesses 100, which are formed by applying Si anisotropic etching to the surface area of the Si bench substrate 74 on which the optical waveguide element 10 is to be mounted. The recess 100 is preferably prepared in the form of a cavity having an inverted trapezoidal cross section with a flat bottom.

A plurality of spherical spacers 94 are arranged between the optical waveguide element 10 and the Si bench substrate 74 such that spacers 94 are arranged in the recesses 100, respectively. Therefore, the diameter of the spacer 94 is adjusted to be larger than that of the spacer 92 used in the optical transmitter-receiver module 1 according to the first embodiment of the invention, by the depth of the recess 100. With the help of this spacer 94, the optical axis height of the optical waveguide element 10 coincides with respective optical axis heights of the optoelectronic part (transmitting side) 30s, the optoelectronic part (receiving side) 30r, and the optical fiber cable 50.

As has been discussed above, according to the optical transmitter-receiver module 2 according to the second embodiment of the invention, when the optical waveguide element 10 is mounted on the Si bench substrate 74, a plurality of spacers 94 can be arranged in a plurality of recesses 100, so that spacers 94 are prevented from being scattered over the surface of the Si bench substrate 74 other than the recesses 100. Accordingly, the optical transmitter-receiver module 2 not only brings the same effect as the optical transmitter-receiver module 1 but also contributes to increasing efficiency in the fabrication work thereof.

[Third Embodiment]

Figure 6:
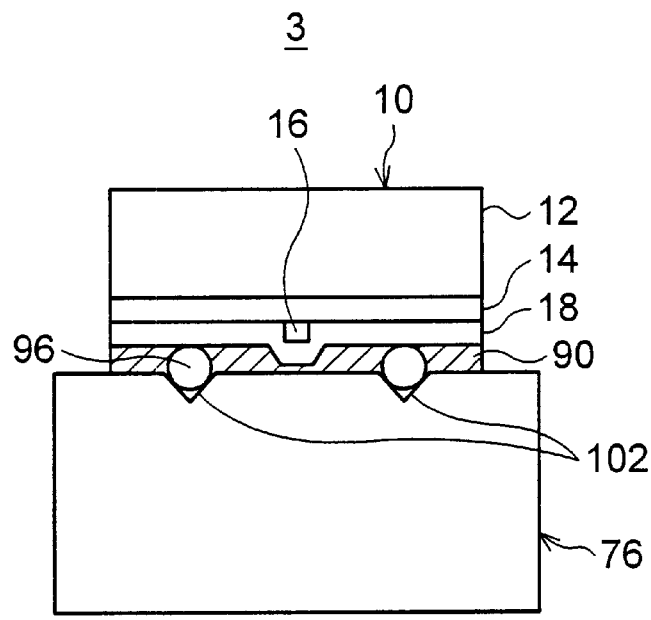
FIG. 6 is a cross sectional view of an optical transmitter-receiver module according to a third embodiment of the invention.

An optical transmitter-receiver module 3 according to a third embodiment of the invention will now be described with reference to FIG. 6. This figure is a cross sectional view of the optical transmitter-receiver module 3 and is equivalent to the C–C' cross sectional view (see FIG. 1 and FIG. 4) of the optical transmitter-receiver module 1 according to the first embodiment of the invention.

The optical transmitter-receiver 3 has such a constitution that can be obtained by substituting an Si bench substrate 76 for the Si bench substrate 70 which is used in the optical transmitter-receiver module 1 according to the first embodiment of the invention. The Si bench substrate 76 is provided with a plurality of recesses 102, which are formed by applying Si anisotropic etching to the surface area of the Si bench substrate 76 on which the optical waveguide element 10 is to be mounted. The recess 102 is preferably prepared in the form of a V-shaped groove, or in the form of an inverted right pyramid cavity or an inverted circular cone cavity.

A plurality of spherical spacers 96 are arranged between the optical waveguide element 10 and the Si bench substrate 76 such that spacers 96 are respectively arranged in the recesses 102. Therefore, the diameter of the spacer 96 is adjusted to be larger by the depth that the spacer will sink into the recess 102, than that of the spacer 92 used in the optical transmitter-receiver module 1 according to the first embodiment of the invention. With the help of this spacer 96, the optical axis height of the optical waveguide element 10 coincides with respective optical axis heights of the optoelectronic part (transmitting side) 30s, the optoelectronic part (receiving side) 30r, and the optical fiber cable 50.

Accordingly, as described above, the optical transmitter-receiver module 3 according to the third embodiment of the invention can bring the same effect as the optical transmitter-receiver module 2 according to the second embodiment of the invention. Furthermore, since the gap distance between the optical waveguide element 10 and the Si bench substrate 76 can be accurately adjusted with ease by taking account of the mutual relation between the diameter of the spacer 96 and the width (wideness of opening) of the recess 102, the optical axis height can be more precisely adjusted to meet respective optical axis heights of other parts, that is, the optoelectronic part (transmitting side) 30s, the optoelectronic part (receiving side) 30r, and the optical fiber cable 50.

[Fourth Embodiment]

Figure 7:
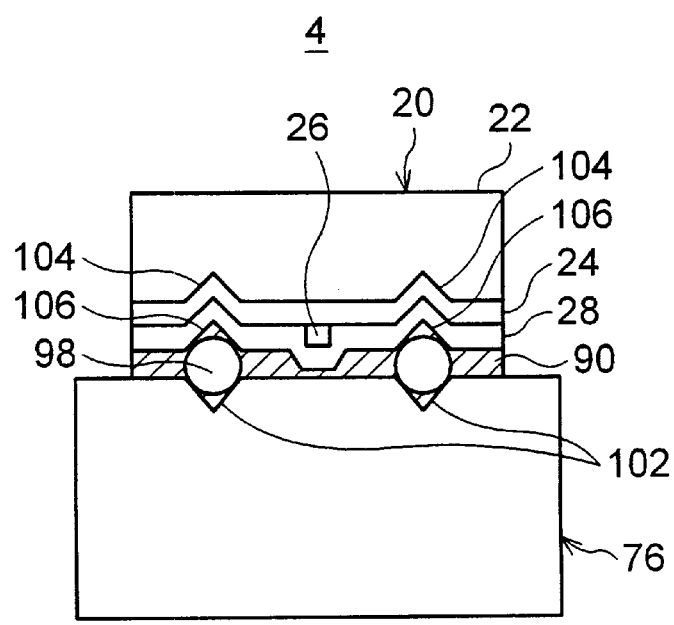
FIG. 7 is a cross sectional view of an optical transmitter-receiver module according to a fourth embodiment of the invention.

An optical transmitter-receiver module 4 according to a fourth embodiment of the invention will now be described with reference to FIG. 7. This figure is a cross sectional view of the optical transmitter-receiver module 4 and is equivalent to the C–C' cross sectional view (see FIG. 1 and FIG. 4) of the optical transmitter-receiver module 1 according to the first embodiment of the invention.

The optical transmitter-receiver 4 has such a constitution that can be obtained by substituting an optical waveguide element 20 for the optical waveguide element 10 as used in the optical transmitter-receiver module 3 according to the third embodiment of the invention. The optical waveguide element 20 consists of an Si substrate 22, a lower clad layer 24, a core layer 26 and an upper clad layer 28, the last three of which are piled up (layered) in sequence on the Si substrate 22 in that order. The Si substrate 22 is provided with a plurality of recesses 104 which are formed by applying the Si anisotropic etching to the surface of the Si substrate 22 on which the lower clad layer 24 is to be formed. Each recess 104 is prepared in the form of a V-shaped groove, or in the form of a right pyramid cavity or a circular cone cavity. When the optical waveguide element 20 is mounted on the Si bench substrate 76, the plurality of recesses 104 are arranged such that they correspond to a plurality of recesses 102 which are formed in the Si bench substrate 102 in a one-to-one correspondence. Consequently, since the Si substrate 22 is provided with a plurality of recesses 104, a plurality of recesses 106 may be formed in the surface of the optical waveguide layer if the optical waveguide layer (i.e., the lower clad layer 24, the core layer 26, and the upper clad layer 28) is formed on the Si substrate 22.

A plurality of spherical spacers 98 are arranged between the optical waveguide element 20 and the Si bench substrate 76 such that spacers 98 are accepted between recesses 102 and 106, respectively. Therefore, the diameter of the spacer 98 is adjusted to be larger by the amount corresponding to the height that the spacer enters the recess 106, than that of the spacer 96 used in the optical transmitter-receiver module 3 according to the third embodiment of the invention. With the help of this spacer 98, the optical axis height of the optical waveguide element 20 comes to coincide with respective optical axis heights of the optoelectronic part (transmitting side) 30s, the optoelectronic part(receiving side) 30r, and the optical fiber cable 50.

Accordingly, as described above, the optical transmitter-receiver module 4 according to the fourth embodiment of the invention can bring the same effect as the optical transmitter-receiver module 3 according to the third embodiment of the invention. Furthermore, since each recess 106 is arranged so as to face a recess 102, each spacer 98 comes to be sandwiched between recesses 102 and 106. Thus, positioning of the optical waveguide element 20 in the direction of a horizontal plane is carried out autonomically. In the optical axis height adjustment of the optical waveguide element 20 according to this embodiment, if recesses 102 and 106 are prepared in the form of a V-shaped groove, the positioning adjustment is autonomically carried out in two directions, one being in the direction of the optical axis height (i.e., Z-axis) and the other in the direction intersecting the longitudinal axis of the V-shaped groove on the Si bench substrate 76 at right angles (i.e., X-axis). Further, if recesses 102 and 106 are prepared in the form of the right pyramid cavity or the circular cone cavity, the adjustment is autonomically carried out in three directions, one being in the direction of the optical axis height (i.e., Z-axis) and the two others being the directions of two axes defined on the surface of the Si bench substrate 76 (i.e., X and Y-axes). As a result the optical axis height adjustment of the optical waveguide element 20 can be autonomically performed with respect to all the axes.

The invention has been discussed so far by way of several preferred embodiments with references to the accompanying drawings, but it should be noted that the invention is not limited by those embodiments. It is apparent that a person with ordinary skill in the art may make variations and modifications within the scope of the claims attached hereto, and it is understood that those variations and modifications naturally belong to the technical category of the invention.

The invention is not only applicable to an optical waveguide element of which the optical waveguide layer (core layer and clad layer) is made of quartz glass, but is also applicable to an optical module provided with an optical waveguide element of which the core layer and/or clad layer is made of another material, for instance, an organic optical waveguide element using an organic material or a semiconductor optical waveguide element using a semiconductor material.

Preferred embodiments of the optical module according to the invention have been described so far by way of the optical transmitter-receiver module, but the invention should not be limited thereto. The invention is applicable to any optical module provided with an optical waveguide element, for instance an optical transmitter module, an optical receiver module, an optical switching module, and so forth.

As has been described in detail so far, according to the invention, the optical axis of the optical waveguide element can be adjusted with ease and high accuracy as well.

The entire disclosure of Japanese Patent Application No. 2000-152906 filed on May 24, 2000 including specification, claims, drawings and summary is incorporated herein by reference in its entirety.

What is claimed is:

1. An optical module comprising:
   a bench substrate;
   an optical waveguide element including an optical waveguide channel layer, said optical waveguide element being mounted on said bench substrate; and
   at least one spherical spacer arranged between said bench substrate and said optical waveguide channel layer such that said optical waveguide element is mounted on said bench substrate via said at least one spherical spacer.

2. The optical module of claim 1, wherein each of said at least one spherical spacer comprises a quartz spherical spacer.

3. The optical module of claims 1, wherein said bench substrate has a waveguide-mounting surface facing said optical waveguide element and including at least one first recess, said optical waveguide element being mounted to said waveguide-mounting surface via said at least one spherical spacer such that each of said at least one spherical spacer is arranged in a respective one of said at least one first recess.

4. The optical module of claim 3, wherein each of said at least one first recess is formed as a V-shaped groove.

5. The optical module of claim 3, wherein said at least one first recess comprises at least one first cavity, each of said at least one spherical spacer being arranged in a respective one of said at least one first cavity, each of said first cavity having inside wall surfaces shaped such that each of said at least one spherical spacer contacts said inside wall surfaces of said respective one of said at least one first cavity at least at three contact points.

6. The optical module of claim 5, wherein each of said at least one first cavity has one of a right pyramid shape and a circular cone shape.

7. The optical module of claim 3, wherein said optical waveguide channel layer has a substrate-mounting surface facing said bench substrate and including at least one second recess, said optical waveguide element being mounted to said bench substrate via said at least one spherical spacer such that each of said at least one spherical spacer is arranged in a respective one of said at least one second recess.

8. The optical module of claim 7, wherein each of said at least one second recess is formed as a V-shaped groove.

9. The optical module of claim 7, wherein said at least one second recess comprises at least one second cavity, each of said at least one spherical spacer being arranged in a respective one of said at least one second cavity, each of said at least one second cavity having inside wall surfaces shaped such that said at least one spherical spacer contacts said inside wall surfaces of said respective one of said at least one second cavity at least at three contact points.

10. The optical module of claim 9, wherein each of said at least one second cavity has one of a right pyramid shape and a circular cone shape.

11. The optical module of claim 1, wherein said optical waveguide channel layer has a substrate-mounting surface facing said bench substrate and including at least one second recess, said optical waveguide element being mounted to said bench substrate via said at least one spherical spacer such that each of said at least one spherical spacer is arranged in a respective one of said at least one second recess.

12. The optical module of claim 11, wherein each of said at least one second recess is formed as a V-shaped groove.

13. The optical module of claim 11, wherein said at least one second recess comprises at least one second cavity, each of said at least one spherical spacer being arranged in a respective one of said at least one second cavity, each of said at least one second cavity having inside wall surfaces shaped such that said at least one spherical spacer contacts said inside wall surfaces of said respective one of said at least one second cavity at least at three contact points.

14. The optical module of claim 13, wherein each of said at least one second cavity has one of a right pyramid shape and a circular cone shape.

15. The optical module of claim 1, further comprising an optical fiber cable mounted on said bench substrate and at least one optoelectronic part mounted on said bench substrate, said optical fiber cable, said optical waveguide element, and said at least one optoelectronic part being arranged such that an optical axis of said optical fiber cable, said optical waveguide element, and said at least one optoelectronic part are coplanar.

16. The optical module of claim 1, wherein said optical waveguide element further includes a base substrate, said optical waveguide channel layer comprising a first clad layer formed on said base substrate, a core layer formed on said first clad layer, and a second clad layer formed on said core layer.

* * * * *